United States Patent
Tomoi

(10) Patent No.: US 8,933,172 B2
(45) Date of Patent: Jan. 13, 2015

(54) THERMOPLASTIC ELASTOMER COMPOSITION AND MANUFACTURING METHOD THEREFOR

(75) Inventor: Shusaku Tomoi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 159 days.

(21) Appl. No.: 13/639,445

(22) PCT Filed: Feb. 10, 2011

(86) PCT No.: PCT/JP2011/053430
§ 371 (c)(1),
(2), (4) Date: Oct. 4, 2012

(87) PCT Pub. No.: WO2011/161981
PCT Pub. Date: Dec. 29, 2011

(65) Prior Publication Data
US 2013/0030124 A1  Jan. 31, 2013

(30) Foreign Application Priority Data
Jun. 25, 2010 (JP) ................. 2010-144833

(51) Int. Cl.
| | |
|---|---|
| *B60C 5/00* | (2006.01) |
| *C08L 25/08* | (2006.01) |
| *C08L 77/02* | (2006.01) |
| *C08G 69/48* | (2006.01) |
| *C08L 63/00* | (2006.01) |
| *C08L 77/06* | (2006.01) |
| *B60C 1/00* | (2006.01) |

(52) U.S. Cl.
CPC ............... *C08L 77/02* (2013.01); *C08G 69/48* (2013.01); *C08L 63/00* (2013.01); *C08L 77/06* (2013.01); *B60C 1/0008* (2013.01); *C08J 2363/00* (2013.01); *C08J 2377/02* (2013.01); *C08J 2377/06* (2013.01); *C08J 2415/02* (2013.01); *C08L 2205/05* (2013.01)
USPC ............................ 525/122; 152/510; 525/179

(58) Field of Classification Search
None
See application file for complete search history.

(56) References Cited

U.S. PATENT DOCUMENTS

| | | | |
|---|---|---|---|
| 5,039,758 A | 8/1991 | Tobita et al. | |
| 6,024,816 A | 2/2000 | Yamakawa et al. | |
| 6,359,071 B1 | 3/2002 | Watanabe et al. | |
| 7,879,272 B2 | 2/2011 | Soeda et al. | |
| 2006/0252874 A1 | 11/2006 | Soeda et al. | |
| 2010/0112257 A1 | 5/2010 | Morooka | |
| 2010/0234500 A1* | 9/2010 | Hara et al. | 524/169 |

FOREIGN PATENT DOCUMENTS

| | | |
|---|---|---|
| CN | 1751094 A | 3/2006 |
| JP | 55-157650 A | 12/1980 |
| JP | 62-039633 A | 2/1987 |
| JP | H01-92223 A | 4/1989 |
| JP | 03-265662 A | 11/1991 |
| JP | 08-216285 A | 8/1996 |
| JP | 8-259741 A | 10/1996 |
| JP | 10-025375 A | 1/1998 |
| JP | 10-114840 A | 5/1998 |
| JP | H11-199713 A | 7/1999 |
| JP | 2000-160024 A | 6/2000 |
| JP | 2006-514138 A | 4/2006 |
| JP | 2010-132850 A | 6/2010 |
| JP | 2010-215727 A | 9/2010 |
| WO | WO-2009/154155 A1 | 12/2009 |

OTHER PUBLICATIONS

Chinese Office Action issued in CN 201180007088.4 dated May 21, 2013 with English translation.

* cited by examiner

*Primary Examiner* — Robert Sellers
(74) *Attorney, Agent, or Firm* — Novak Druce Connolly Bove + Quigg LLP

(57) ABSTRACT

A thermoplastic elastomer composition having a continuous phase and a dispersed phase, wherein the continuous phase comprising (A) an epoxy-modified polyamide resin, and the dispersed phase comprising (B) a halogenated isoolefin-paraalkylstyrene copolymer rubber, wherein the thermoplastic elastomer composition is obtained by melt-kneading (B) halogenated isoolefin-paraalkylstyrene copolymer rubber, (C) a polyamide resin, and (D) a polyfunctional epoxy compound having two or more epoxy groups per molecule in an amount of 0.05 parts by weight or more and less than 3 parts by weight with respect to 100 parts by weight of polyamide resin (C), at a temperature which is equal to or more than the melting point of polyamide resin (C), and epoxy-modified polyamide resin (A) is produced by the reaction of polyamide resin (C) with polyfunctional epoxy compound (D) during the melt-kneading.

19 Claims, No Drawings

THERMOPLASTIC ELASTOMER COMPOSITION AND MANUFACTURING METHOD THEREFOR

CROSS REFERENCE TO RELATED APPLICATIONS

This application is a National Phase filing under 35 U.S.C. §371 of PCT/2011/053430 filed on Feb. 10, 2011; and this application claims priority to Application No. 2010-144833 filed in Japan on Jun. 25, 2010 under 35 U.S.C. §119; the entire contents of all are hereby incorporated by reference.

TECHNICAL FIELD

The present invention relates to a thermoplastic elastomer composition, and more particularly, a thermoplastic elastomer composition having excellent fatigue durability and processability and a method for producing the same, as well as a pneumatic tire using the thermoplastic elastomer composition in an innerliner.

BACKGROUND ART

A thermoplastic elastomer composition superior in balance between anti-air permeability and flexibility is known, which comprises a specific thermoplastic resin continuous phase and a specific robber elastomer component dispersed therein as a discontinuous phase (Japanese Unexamined Patent Publication. No. 8-259741). In addition, it is known that by having a melt viscosity ($\eta_m$) of a thermoplastic resin component and a melt viscosity ($\eta_d$) of a rubber elastomer component in the thermoplastic elastomer composition and the difference in solubility parameter ($\Delta$SP) between the elastomer component and the thermoplastic resin component to satisfy a specific relationship, a high elastomer component proportion is achieved, and thereby a thermoplastic elastomer composition having an increased flexibility and excellent anti-gas permeability is obtained, and a pneumatic tire using the same in a gas permeation preventing layer is also known (Japanese Unexamined Patent Publication No. 10-2537.5). Further, there is also known a thermoplastic elastomer composition having an improved anti-gas permeation properties as well as flexibility, oil resistance, cold resistance, and heat resistance by the presence of a barrier resin composition having such a phase structure as the barrier resin composition is dispersed in a flat shape in an elastomer composition comprising a thermoplastic resin as a continuous phase and a rubber composition as a dispersed phase (Japanese Unexamined Patent Publication No. 10-114840). Moreover, there is also known a thermoplastic elastomer composition comprising a polyamide resin modified with a laminar clay mineral and a halogenated isoolefin-paraalkylstyrene copolymer dispersed therein (Japanese Unexamined Patent Publication No. 2000-160024).

SUMMARY OF INVENTION

Problems to be Solved by the Invention

In a dynamically cross-linked thermoplastic elastomer composition of a polyamide resin and a halogenated isoolefin-paraalkylstyrene copolymer rubber, it has been known, that the mote finely the halogenated isoolefin-paraalkylstyrene copolymer rubber is dispersed in the polyamide resin, and the higher volume fraction the halogenated isoolefin-paraalkylstyrene copolymer rubber is loaded with respect to the polyamide resin, the higher the resulting dynamically crosslinked thermoplastic elastomer composition's fatigue durability. However, since a halogenated isoolefin-paraalkyl styrene copolymer rubbers reacts with a polyamide resin, the more finely the halogenated isoolefin-paraalkylstyrene copolymer rubber is dispersed, and the higher volume fraction the halogenated isoolefin-paraalkylstyrene copolymer rubber is loaded with respect to the polyamide resin, the higher the total surface area of the interface of the particles of the halogenated isoolefin-paraalkylstyrene copolymer rubber in contact with the polyamide resin, and accordingly, the more the number of the halogenated isoolefin-paraalkylstyrene copolymer rubber molecules reacted with the polyamide resin-molecule per unit volume, which results in problems that the flowability of the melt-kneaded material is reduced, and the processability (kneadability, thermal stability, film-forming properties, etc.) is significant decreased.

Means to Solve the Problems

The inventors have made studies with a view to solve the above problems, and as a result found that, a thermoplastic elastomer composition having excellent fatigue durability and excellent processability (kneadability, thermal stability, film-forming properties, etc.) can be obtained by reacting a polyamide resin with a polyfunctional epoxy compound having two or more epoxy groups per molecule to convert the polyamide resin into an epoxy-modified polyamide resin during melt-kneading of the polyamide resin and a halogenated isoolefin-paraalkylstyrene copolymer rubber.

According to the present invention, there is provided a thermoplastic elastomer composition having a continuous phase and a dispersed phase, wherein the continuous phase comprising (A) an epoxy-modified polyamide resin, and the dispersed phase comprising (B) a halogenated isoolefin-paraalkylstyrene copolymer rubber, wherein the thermoplastic elastomer composition is obtained by melt-kneading:

(B) halogenated isoolefin-paraalkylstyrene copolymer rubber, (C) a polyamide resin, and (D) a polyfunctional epoxy compound having two or more epoxy groups per molecule in an amount of 0.05 parts by weight or more and less than 3 parts by weight with respect to 100 parts by weight of polyamide resin (C), at a temperature which is equal to or more than the melting point of polyamide resin (C), and epoxy-modified polyamide resin (A) is produced by the reaction of polyamide resin (C) with polyfunctional epoxy compound (D) during the melt-kneading.

According to the present invention, there is also provided a method for producing a thermoplastic elastomer composition having a continuous phase and a dispersed phase, wherein the continuous phase comprising (A) an epoxy-modified polyamide resin, and the dispersed phase comprising (B) a halogenated isoolefin-paraalkylstyrene copolymer rubber, comprising a step of melt-kneading:

(B) the halogenated isoolefin-paraalkylstyrene copolymer rubber, (C) a polyamide resin, and (D) a polyfunctional epoxy compound having two or more epoxy groups per molecule in an amount of 0.05 parts by weight or more and less than 3 parts by weight with respect to 100 parts by weight of polyamide resin (C), at a temperature which is equal to or more than the melting point of polyamide resin (C).

Effects of the Invention

According to the present invention, a thermoplastic elastomer composition having excellent fatigue durability and processability can be provided by reacting a polyamide resin with a polyfunctional epoxy compound having two or more epoxy groups per molecule to convert the polyamide resin to an epoxy-modified polyamide resin during melt-kneading of the polyamide resin and a halogenated isoolefin-paraalkylstyrene copolymer rubber. In addition, the thermoplastic elastomer composition according to the present invention has excellent gas barrier properties originated from the polyamide resin, as well as excellent fatigue durability and processability as described above.

Mode for Carrying out the Invention

In the thermoplastic elastomer composition of the present invention, epoxy-modified polyamide resin (A) forms a continuous phase, and halogenated isoolefin-paraalkylstyrene copolymer rubber (B) forms a dispersed phase. That is, halogenated isoolefin-paraalkylstyrene copolymer rubber (B) is in the form which is discontinuously dispersed in the continuous phase comprising epoxy-modified polyamide resin (A).

Epoxy-modified polyamide resin (A) which forms a continuous phase in the thermoplastic elastomer composition of the present invention is produced by the reaction of polyamide resin (C) with polyfunctional epoxy compound (D) during melt-kneading polyamide resin (C), halogenated isoolefin-paraalkylstyrene copolymer rubber (B), and polyfunctional epoxy compound (D) having two or more epoxy groups per molecule in an amount of 0.05 parts by weight or more and less than 3 parts by weight based on 100 parts by weight of polyamide resin (C), at a temperature which is equal to or more than the melting point of polyamide resin (C).

Examples of polyamide resin (C) include nylons such as Nylon 11, Nylon 12, Nylon 6, Nylon 66, Nylon 6/66, Nylon 6/12, Nylon 6/10, Nylon 4/6, Nylon 6/66/12 and aromatic nylons. Polyamide resin (C) may be comprised of one of these polyamide resins or two or more of these polyamide resins. Polyamide resins (C) is preferably Nylon 6 and Nylon 6/66, in view of achieving both fatigue durability and gas barrier properties.

Halogenated isoolefin-paraalkylstyrene copolymer rubber (B) used in the present invention can be produced by, for example, halogenating a copolymer of an isoolefin and a paraalkylstyrene. The mixing ratio of the isoolefin and paraalkylstyrene, polymerization degree, average molecular weight, polymerization configuration (block copolymer, random copolymer, etc.), viscosity, halogen atom, etc., are not particularly limited, and can be selected by a person with ordinary skill in the art according to the physical properties, etc., required of the thermoplastic elastomer composition. Examples of the isoolefin which constitutes halogenated isoolefin-paraalkylstyrene copolymer rubber (B) include isobutylene, isopentene, isohexene, etc., and isobutylene is preferred as the isoolefin. Examples of the paraalkylstyrene which constitutes halogenated isoolefin-paraalkylstyrene copolymer rubber (B) include paramethylstyrene, paraethylstyrene, parapropylstyrene, parabutylstyrene, etc., and paramethylstyrene is preferred as the paraalkylstyrene. Examples of the halogen which constitutes halogenated isoolefin-paraalkylstyrene copolymer rubber (B) include fluorine, chlorine, bromine, and iodine, and bromine is preferred as the halogen. Particularly preferred halogenated isoolefin-paraalkylstyrene copolymer rubber is brominated isobutylene-paramethylstyrene copolymer rubber. Brominated isobutylene-paramethylstyrene copolymer rubber is available from ExxonMobile Chemical Company under the trade name of Exxpro®.

Halogenated isoolefin-paraalkylstyrene copolymer rubber (B) is preferably dynamically crosslinked. The continuous phase and dispersed phase of the thermoplastic elastomer composition can be fixed by dynamic crosslinking. The dynamic crosslinking can be carried out by melt-kneading polyamide resin (C), halogenated isoolefin-paraalkylstyrene copolymer rubber (B), and polyfunctional epoxy compound (D) having two or more epoxy groups per molecule in an amount of 0.05 parts by weight or more and less than 3 parts by weight with respect to 100 parts by weight of polyamide resin (C), at a temperature which is equal to or more than the melting point of polyamide resin (C), preferably under the presence of a crosslinking agent. Preferably, the amount of halogenated isoolefin-paraalkylstyrene copolymer rubber (B) is 40 to 70% by weight, and more preferably 45 to 65% by weight, based on the total amount of polyamide resin (C) and halogenated isoolefin-paraalkylstyrene copolymer rubber (B). Too low a proportion of halogenated isoolefin-paraalkylstyrene copolymer rubber (B) results in decrease in fatigue durability, while too much a proportion of halogenated isoolefin-paraalkylstyrene copolymer rubber (B) results in decrease in flowability during melting, and thereby decreases processability.

A person with ordinary skill in the art can appropriately select the type and amount of the cross-linking agent, depending on the dynamic crosslinking conditions. Examples of the crosslinking agent include zinc oxide, stearic acid, zinc stearate, magnesium oxide, m-phenylene-bis-maleimide, alkylphenol resins and halogenated products thereof, secondary amines such as N-(1,3-dimethylbutyl)-N'-phenyl-p-phenylenediamine, etc. In particular, zinc oxide, stearic acid, zinc stearate, and N-(1,3-dimethylbutyl)-N'-phenyl-p-phenylenediamine can be preferably used as a crosslinking agent for dynamic crosslinking. The amount of the crosslinking agent is typically 0.1 to 12 parts by weight, and more preferably 3 to 9 parts by weight, with respect to 100 parts by weight of halogenated isoolefin-paraalkylstyrene copolymer rubber (B). Too low an amount of the crosslinking agent results in insufficient dynamic crosslinking, and the fine dispersion of halogenated isoolefin-paraalkylstyrene copolymer rubber (B) cannot be maintained leading to decrease in fatigue durability. Reversibly, too much an amount of the crosslinking agent causes scorching during kneading and processing, and appearance defects after film formation, such as fish-eye.

Polyfunctional epoxy compound (D) has two or more epoxy groups per molecule, preferably 2 to 3 epoxy groups per molecule, and more preferably 2 epoxy groups per molecule. Examples of the polyfunctional epoxy compound include di-functional epoxy compounds such as bisphenol F epoxy resins, bisphenol A epoxy resins, ethylene glycol diglycidylether, diethylene glycol diglycidylether, polyethylene glycol diglycidylether, etc.; tri-functional epoxy compounds such as glycerol polyglycidylether, etc.; and higher-functional epoxy compounds such as epoxidized soybean oil, epoxidized linseed oil, epoxidized polybutadiene, sorbitol polyglycidylether, etc. One of these polyfunctional epoxy compound may be used, or two or more of these polyfunctional epoxy compounds may be used in combination. The amount of polyfunctional epoxy compound (D) is 0.05 parts by weight or more and less than 3 parts by weight, and preferably 0.05 parts by weight or more and 2 parts by weight or less, with respect to 100 parts by weight of polyamide resin (C). An amount of polyfunctional epoxy compound (D) of less than 0.05 parts by weight with respect to 100 parts by weight of polyamide resin (C) has a small effect on the improvement of the processability (flowability) when a high amount of halogenated isoolefin-paraalkylstyrene copolymer rubber (B) is loaded, and therefore is not preferable. An amount of polyfunctional epoxy compound (D) which is equal to or more than 3 parts by weight with respect to 100 parts by weight of polyamide resin (C) results in decrease in fatigue durability, and therefore is not preferable.

To improve the compatibility of halogenated isoolefin-paraalkylstyrene copolymer rubber (B) to epoxy-modified polyamide resin (A), a compatibilizer such as olefin copolymers that have been modified with an acid anhydride (for example, maleic anhydride-modified ethylene-unsaturated carboxylic acid copolymers such as maleic anhydride-modified ethylene-ethyl acrylate copolymer, etc.; maleic anhydride-modified ethylene-α-olefin copolymers such as maleic anhydride-modified ethylene-propylene copolymer, maleic anhydride-modified ethylene-butene-1 copolymer, maleic anhydride-modified ethylene-hexene-1 copolymer, maleic anhydride-modified ethylene-octene-1 copolymer, etc.) and styrene-olefin copolymers that have been modified with an acid anhydride (for example, maleic anhydride styrene-ethylene-butylene-styrene copolymer, maleic anhydride-modified styrene-ethylene-propylene-styrene copolymer, etc.) may be mixed or kneaded with the polyamide resin and/or halogenated isoolefin-paraalkylstyrene copolymer rubber in advance prior to melt-kneading of polyamide resin (C), halogenated isoolefin-paraalkylstyrene copolymer rubber (B), and polyfunctional epoxy compound (D), or may be added during melt-kneading of components (B) to (D). The amount of such a compatibilizer is not particularly limited, and is typically 5 to 50% by weight based on the total weight of halogenated isoolefin-paraalkylstyrene copolymer rubber (B).

In addition to the above components, various ingredients that are commonly used in resin and rubber compositions, such as carbon black, silica, and other reinforcing agents (fillers), vulcanizing or crosslinking agents, vulcanization or crosslinking accelerators, plasticizer, various oils, antioxidants, may be added to the thermoplastic elastomer composition of the present invention. These ingredients may be used in conventional amounts, insofar as the object of the present invention is not diminished.

The thermoplastic elastomer composition of the present invention can be prepared by melt-kneading the essential components and optional ingredients as described above using a kneading machine, such as a kneader, Banbury mixer, single-screw kneading extruder, twin-screw kneading extruder, etc., that are commonly used in preparing a thermoplastic resin composition. The melt-kneading is preferably carried out using a twin-screw kneading extruder, in view of its high productivity. Although the kneading conditions depend on the types and amounts of the essential components and optional ingredients to be used, the lower limit of the melt-kneading temperature is at least equal to or more than the melting temperature of polyamide resin (C), preferably at a temperature which is 20° C. or more higher than the melting point of polyamide resin (C), and is typically from about 180° C. to about 300° C. The melt-kneading period of time is typically from 30 seconds to 10 minutes, and preferably from 1 to 5 minutes.

The melt kneaded mixture obtained by melt-kneading may then be extruded, for example, from a die attached to the outlet port of the twin-screw kneading extruder using a common method into a shape such as a film form, a sheet from, a tube form, etc., or into a strand form, and pelletized with a resin pelletizer, and subsequently the resulting pellets are formed into a desired form such as a film, sheet, or tube form by a common resin forming method such as inflation forming, calendar forming, extrusion forming, etc., depending on the intended application.

The pneumatic tire of the present invention is a pneumatic tire using the thermoplastic elastomer composition obtained by the above production method in an innerliner. More specifically, the pneumatic tire of the present invention is a pneumatic tire using the film or laminate of the thermoplastic elastomer composition in an innerliner. Any conventional method may be used for producing the pneumatic tire. For example, the thermoplastic elastomer composition of the present invention is extruded into a film having a predetermined width and thickness, and the resulting film is laminated onto a tire molding drum in cylindrical form, tire members such as a carcass layer, a belt layer, a tread layer, etc., that are commonly used in tire production are sequentially laminated thereon, and the resulting green tire is removed from the drum. Then, the green tire is vulcanized in accordance with a conventional procedure to manufacture a desired pneumatic tire.

The thermoplastic elastomer composition of the present invention can also be used in producing a hose. Any conventional method may be used for producing a hose using the thermoplastic elastomer composition of the present invention. For example, a hose can be produced by the following manner. First, by using the pellets of the thermoplastic elastomer composition, the thermoplastic elastomer composition is extruded on a mandrel with a resin extruder in a crosshead extrusion manner to form an inner tube. In addition, an additional thermoplastic elastomer composition of the present invention or a common thermoplastic rubber composition may be extruded on the inner tube to form a inner tube outer layer. Then, if necessary, an adhesive is applied onto the inner tube by coating, spraying, etc. Further, reinforcing yarns or reinforcing steel wires are braided on the inner tube using a braiding machine. If necessary, another adhesive is applied onto the resulting reinforcing layer to adhere the reinforcing layer with an outer tube, and subsequently, the thermoplastic elastomer composition of the present invention or other common thermoplastic rubber composition is extruded with a crosshead resin extruder in the same manner to form an outer tube. Finally, the mandrel is withdrawn to obtain a hose. The adhesive which can be applied onto the inner tube or on the reinforcing layer includes isocyanate-based, urethane-based, phenol resin-based, resorcin-based, chlorinated rubber-based, and HRH-based adhesives, and isocyanate-based adhesives and urethane-based adhesives are particularly preferred.

EXAMPLES

The present invention will be further explained with reference to the following examples and comparative examples, and it should be understood that the scope of the present invention is not limited by these examples.

In the preparation of the thermoplastic elastomer compositions of Examples 1 to 3 and Comparative Examples 1 to 3, the following raw materials were used.

Raw Materials

Halogenated isoolefin-paraalkylstyrene copolymer rubber (brominated isobutylene-paramethylstyrene copolymer rubber): Exxpro® MDX89-4 (hereinafter abbreviated to as "Br-IPMS") manufactured by ExxonMobile Chemical Company Polyamide resin: Nylon 6/66 (UBE Nylon 5013B) manufactured by Ube Industries, Ltd.

Polyfunctional epoxy compound 1: Bisphenol F-type epoxy resin (YDF-170 manufactured by Nippon Steel Chemical Co., Ltd., di-functional)

Polyfunctional epoxy compound 2: epoxidized soybean oil (Epocizer W100-EL manufactured by DIC Corporation)

Zinc oxide: zinc oxide of JIS grade 3 manufactured by Seido Chemical Industry Co., Ltd.

Stearic acid: Beads Stearic Acid manufactured by Nippon Oil & Fat Co., Ltd.

Zinc stearate: manufactured by Sakai Chemical Industry Co., Ltd.

Compatibilizer: maleic anhydride-modified ethylene-ethyl acrylate copolymer (HPR AR201 manufactured by Mitsui-DuPont Polychemicals Co., Ltd.)

Preparation of Thermoplastic Elastomer Composition of Comparative Example 1

A rubber and crosslinking agents (zinc oxide, stearic acid, and zinc stearate) were mixed at a proportion shown in Table 1 for 2 minutes at 100° C. in a closed-type Banbury mixer (manufactured by Kobe Steel Ltd.) to form a rubber compound, and the resulting rubber compound was processed into the form of pellets by a rubber pelletizer (manufactured by Moriyama Co., Ltd.). The resulting rubber compound pellets, a polyamide resin, and a compatibilizer were kneaded for 3 minutes at 250° C. in a twin-screw kneader (manufactured by The Japan Steel Works, Ltd.). The melt-kneaded mixture was continuously extruded from the extruder into a strand form, and was cut into the form of pellets by a water-cooled cutter to obtain a thermoplastic elastomer composition in the form of pellets. Comparative Example 1 is an example of a thermoplastic elastomer free of epoxy compound.

Preparations of Thermoplastic Elastomer Compositions of Examples 1 to 3 and Comparative Examples 2 to 3

In accordance with the formulations shown in Table 1, a rubber and Crosslinking agents (zinc oxide, stearic acid, and zinc stearate) were mixed for 2 minutes at 100° C. in a closed-type Banbury mixer (manufactured by Kobe Steel Ltd.) to form a rubber compound, and processed into the form of pellets by a rubber pelletizer (manufactured by Moriyama Co., Ltd.). The resulting rubber compound pellets, a polyamide resin, and a compatibilizer were kneaded for 3 minutes at 250° C. by a twin-screw kneader (manufactured by The Japan Steel Works, Ltd.). In this process, an epoxy compound was added to the melt-kneaded mixture using a liquid feeding pump (manufactured by Kamacho Scale Co., Ltd.). The melt-kneaded mixture was continuously extruded from the extruder into a strand form, and was cut into the form of pellets by a water-cooled cutter to obtain a thermoplastic elastomer composition in the form of pellets.

Test Methods (1) Kneading Properties

In the preparation of each of the thermoplastic elastomer compositions of Examples and Comparative Examples, the thermoplastic elastomer composition extruded into a strand form from the twin-screw kneading extruder and the appearance thereof were observed, and the kneading properties were evaluated according to the following criteria:

Good: The surface of the strand was smooth.

Fair: The presence of a slight particulate defect or roughening on the surface of the strand, or a slight pulsating discharge of the strand was observed.

Poor: The presence of roughenings on the surface of the strand and a significant discharge failure were observed.

(2) Thermal Stability

Each of the thermoplastic elastomer composition of Examples 1 to 3 and Comparative Examples 1 and 2 was evaluated for thermal stability by determining (i) the rate of change in capillary shear viscosity and (ii) extrusion molding properties, as described below. For the thermoplastic elastomer composition of Comparative Example 3, the thermal stability and fatigue durability were not evaluated, since the discharge failure of the strand was significant.

(i) Rate of Change in Capillary Shear Viscosity

A capillary rheometer Capillograph 1C manufactured by Toyo Seiki Seisaku-sho, Ltd. was used to measure capillary shear viscosity, and the melt viscosity (in unit: Pa·s) of the thermoplastic elastomer compositions were measured at a shear rate of 243 $\text{sec}^{-1}$, a temperature of 250° C., and retention times of 5 minutes and 10 minutes, using an orifice having a diameter of 1 mm and a length of 10 mm. The difference between the viscosity measured at a retention time of 10 minutes and the viscosity measured at a retention tome of 5 minutes was represented in percentage with respect to the viscosity measured at a retention time of 5 minutes and was reported as a rate of change. A rate of change of less than 20% was evaluated as "Good", and a rate of change of 20% or more was evaluated as "Poor".

(ii) Extrusion Molding Properties

A thermoplastic elastomer composition was extruded with a T-die extrusion molding machine (die width: 200 mm) at a temperature of 220° C. into a sheet having a thickness of 1 mm. After operating the molding machine, the operation of the molding machine was once stopped for 3 minutes, and then the operation of the molding machine was restarted. The appearance of the extruded sheet obtained before the stoppage of the operation of the molding machine and the appearance of the extruded sheet obtained after the restart of the operation were observed, and evaluated for thermal stability according to the following criteria:

Good: There was no change in appearance of the extruded sheet obtained after the restart of the operation, compared to the extruded sheet obtained before the stoppage of the operation.

Fair: For the extruded sheet obtained after the restart of the operation, the presence of a slight particulate defect or a slight surface roughening was observed.

Poor: For the extruded sheet obtained after the restart of the operation, many particulate defects or surface roughenings were observed.

(3) Fatigue Durability

A thermoplastic elastomer composition was formed into a sheet having a thickness of 1 mm, and JIS-Type 3 dumbbell samples were punched out from the resulting sheet. The resulting samples were subjected to repeated fatigues using a Constant Strain Fatigue Tester (manufactured by Ueshima Seisakusho Co., Ltd.) at a temperature of −25° C. and a strain rate of 40% up to 1 million cycles. For each of the thermoplastic elastomer compositions of examples and comparative examples, twelve samples were measured, and the number of times to breakage was Weibull plotted, and the 63% breakage probability point was determined as fatigue durability. The higher the number of times, the better the fatigue durability.

The test results are shown in Table 1 below.

TABLE 1

Formulations (in parts by weight) and Test Results of Compositions of Examples 1 to 3 and Comparative Examples 1 to 3

|  | Example 1 | Example 2 | Example 3 | Comparative Example 1 | Comparative Example 2 | Comparative Example 3 |
| --- | --- | --- | --- | --- | --- | --- |
| Components |  |  |  |  |  |  |
| Br-IPMS | 100 | 100 | 100 | 100 | 100 | 100 |
| Zinc oxide | 5.00 | 5.00 | 5.00 | 5.00 | 5.00 | 5.00 |
| Stearic acid | 0.60 | 0.60 | 0.60 | 0.60 | 0.60 | 0.60 |
| Zinc stearate | 0.30 | 0.30 | 0.30 | 0.30 | 0.30 | 0.30 |
| Polyamide resin | 90 | 90 | 90 | 90 | 90 | 90 |
| Compatibilizer | 10 | 10 | 10 | 10 | 10 | 10 |
| Polyfunctional epoxy compound 1 | 0.045 | 1.8 | — | — | 0.009 | 2.7 |
| Polyfunctional epoxy compound 2 | — | — | 1.8 | — | — | — |
| Amount (in parts by weight) of polyfunctional epoxy compound with respect to 100 parts by weight of polyamide resin | 0.05 | 2.00 | 2.00 | 0 | 0.01 | 3.00 |
| Test Results |  |  |  |  |  |  |
| Kneading properties | Good | Fair | Good | Good | Good | Poor |
| Change in capillary shear viscosity | Good (18%) | Good (10%) | Good (14%) | Good (90%) | Poor (90%) | — |
| Extrusion molding properties | Good | Good | Good | Poor | Poor | — |
| Fatigue durability (the number of times) | 1,000,000 | 300,000 | 400,000 | 1,000,000 | 1,000,000 | — |

The above test results show that the thermoplastic elastomer compositions of the present invention (Examples 1 to 3) had excellent kneading properties, thermal stability, and fatigue durability. Although a slight particulate defect was observed in evaluating the kneading properties of the thermoplastic elastomer composition of Example 2, and a decrease in fatigue durability was observed in Examples 2 and 3, both are within a permissible range. In contrast, Comparative Example 1 free of polyfunctional epoxy compound and Comparative Example 2 in which the amount of the polyfunctional epoxy compound is less than the range of the present invention exhibited poor thermal stability. Comparative Example 3 in which the amount of the polyfunctions 1 epoxy compound exceeds the range of the present invention exhibited a significantly poor strand discharge.

INDUSTRIAL APPLICABILITY

The thermoplastic elastomer composition of the present invention can be suitably used as an innerliner of a pneumatic tire. Further, the thermoplastic elastomer composition of the present invention is useful as a barrier material in such rubber laminates requiring gas barrier properties, such as a hose, a fender, a rubber bag, a fuel tank, etc., in addition to a pneumatic tire.

The invention claimed is:

1. A thermoplastic elastomer composition having a continuous phase and a dispersed phase, wherein the continuous phase comprising (A) an epoxy-modified polyamide resin, and the dispersed phase comprising (B) a halogenated isoolefin-paraalkylstyrene copolymer rubber, wherein the thermoplastic elastomer composition is obtained by melt-kneading:
(B) halogenated isoolefin-paraalkylstyrene copolymer rubber,
(C) a polyamide resin, and
(D) a polyfunctional epoxy compound having two or more epoxy groups per molecule in an amount of 0.05 parts by weight or more and less than 3 parts by weight with respect to 100 parts by weight of polyamide resin (C), at a temperature which is equal to or more than the melting point of polyamide resin (C), and epoxy-modified polyamide resin (A) is produced by the reaction of polyamide resin (D) with polyfunctional epoxy compound (D) during the melt-kneading.

2. The thermoplastic elastomer composition according to claim 1, wherein polyamide resin (C) is selected from the group consisting of Nylon 11, Nylon 12, Nylon 6, Nylon 66, Nylon 6/66, Nylon 6/12, Nylon 6/10, Nylon 4/6, Nylon 6/66/12, aromatic nylons, and combinations of two or more thereof.

3. The thermoplastic elastomer composition according to claim 1, wherein halogenated isoolefin-paraalkylstyrene copolymer rubber (B) is brominated isobutylene-paramethylstyrene copolymer rubber.

4. The thermoplastic elastomer composition according to claim 1, wherein halogenated isoolefin-paraalkylstyrene copolymer rubber (B) is dynamically crosslinked.

5. The thermoplastic elastomer composition according to claim 1, wherein halogenated isoolefin-paraalkylstyrene copolymer rubber (B) is dynamically crosslinked in the presence of a crosslinking agent comprising zinc oxide.

6. The thermoplastic elastomer composition according to claim 1, wherein the amount of halogenated isoolefin-paraalkylstyrene copolymer rubber (B) is from 40 to 70% by weight based on the total amount of polyamide resin (C) and halogenated isoolefin-paraalkylstyrene copolymer rubber (B).

7. A method for producing a thermoplastic elastomer composition having a continuous phase and a dispersed phase, wherein the continuous phase comprising (A) an epoxy-modified polyamide resin, and the dispersed phase comprising (B) a halogenated isoolefin-paraalkylstyrene copolymer rubber, comprising a step of melt-kneading:
(B) halogenated isoolefin-paraalkylstyrene copolymer rubber,
(C) a polyamide resin, and (D) a polyfunctional epoxy compound having two or more epoxy groups per molecule in an amount of 0.05 parts by weight or more and less than 3 parts by weight with respect to 100 parts by weight of polyamide resin (C), at a temperature which is equal to or more than the melting point of polyamide resin (C).

8. A pneumatic tire using the thermoplastic elastomer composition of according to claim 1 in an innerliner.

9. The thermoplastic elastomer composition according to claim 1, wherein polyamide resin (C) is selected from the group consisting of Nylon 11, Nylon 12, Nylon 6, Nylon 66, Nylon 6/66, Nylon 6/12, Nylon 6/10, Nylon 4/6, Nylon 6/66/12, aromatic nylons, and combinations of two or more thereof, and halogenated isoolefin-paraalkylstyrene copolymer rubber (B) is brominated isobutylene-paramethylstyrene copolymer rubber.

10. The thermoplastic elastomer composition according to claim 9, wherein halogenated isoolefin-paraalkylstyrene copolymer rubber (B) is dynamically crosslinked.

11. The thermoplastic elastomer composition according to claim 9, wherein halogenated isoolefin-paraalkylstyrene copolymer rubber (B) is dynamically crosslinked in the presence of a crosslinking agent comprising zinc oxide.

12. The thermoplastic elastomer composition according to claim 9, wherein the amount of halogenated isoolefin-paraalkylstyrene copolymer rubber (B) is from 40 to 70% by weight based on the total amount of polyamide resin (C) and halogenated isoolefin-paraalkylstyrene copolymer rubber (B).

13. The thermoplastic elastomer composition according to claim 10, wherein the amount of halogenated isoolefin-paraalkylstyrene copolymer rubber (B) is from 40 to 70% by weight based on the total amount of polyamide resin (C) and halogenated isoolefin-paraalkylstyrene copolymer rubber (B).

14. The thermoplastic elastomer composition according to claim 11, wherein the amount of halogenated isoolefin-paraalkylstyrene copolymer rubber (B) is from 40 to 70% by weight based on the total amount of polyamide resin (C) and halogenated isoolefin-paraalkylstyrene copolymer rubber (B).

15. A pneumatic tire using the thermoplastic elastomer composition of claim 2 in an innerliner.

16. A pneumatic tire using the thermoplastic elastomer composition of claim 3 in an innerliner.

17. A pneumatic tire using the thermoplastic elastomer composition of claim 4 in an innerliner.

18. A pneumatic tire using the thermoplastic elastomer composition of claim 5 in an innerliner.

19. A pneumatic tire using the thermoplastic elastomer composition of claim 6 in an innerliner.

* * * * *